United States Patent
Steer et al.

(10) Patent No.: US 8,179,825 B2
(45) Date of Patent: May 15, 2012

(54) METHOD AND SYSTEM FOR DETECTING RADAR SIGNALS

(75) Inventors: David Steer, Nepean (CA); Adrian Smith, Kanata (CA)

(73) Assignee: Nortel Networks Limited, St. Laurent, Quebec ( * ) Notice: Subject to any disclaimer, the term of this patent is extended or adjusted under 35 U.S.C. 154(b) by 914 days.

(21) Appl. No.: 11/315,292

(22) Filed: Dec. 23, 2005

(65) Prior Publication Data

US 2006/0258296 A1    Nov. 16, 2006

Related U.S. Application Data

(60) Provisional application No. 60/680,467, filed on May 12, 2005.

(51) Int. Cl.
*H04B 7/00* (2006.01)

(52) U.S. Cl. .................... 370/310; 370/338; 342/57

(58) Field of Classification Search .................. 370/310, 370/329, 332, 338, 343, 431, 445; 445/63.1, 445/67.13; 342/57, 159
See application file for complete search history.

(56) References Cited

U.S. PATENT DOCUMENTS

| | | | | |
|---|---|---|---|---|
| 5,189,428 A | * | 2/1993 | Bouvet et al. | 342/132 |
| 5,260,711 A | * | 11/1993 | Sterzer | 342/375 |
| 6,697,013 B2 | * | 2/2004 | McFarland et al. | 342/159 |
| 6,891,496 B2 | * | 5/2005 | Husted et al. | 342/57 |
| 6,954,171 B2 | * | 10/2005 | Husted et al. | 342/57 |
| 6,996,075 B2 | * | 2/2006 | Santhoff et al. | 370/310 |
| 7,129,884 B1 | * | 10/2006 | Tehrani et al. | 342/20 |
| 7,161,466 B2 | * | 1/2007 | Chuey | 340/5.26 |
| 7,269,151 B2 | * | 9/2007 | Diener et al. | 370/329 |
| 7,400,612 B2 | * | 7/2008 | Yamaura | 370/338 |
| 7,433,383 B2 | * | 10/2008 | Lemberger et al. | 375/142 |
| 2003/0214430 A1 | * | 11/2003 | Husted et al. | 342/57 |
| 2006/0007040 A1 | * | 1/2006 | Kawasaki | 342/368 |

* cited by examiner

*Primary Examiner* — Dang T Ton
*Assistant Examiner* — Brian O Connor

(57) ABSTRACT

A method and system for detecting RADAR signals in a radio communications system is provided. A detection system includes a pulse examination. Based on the result from the examination/analysis, a RADAR pulse is detected. The examination/analysis may include a correlator for correlating received pulses with themselves or samples previously obtained.

32 Claims, 10 Drawing Sheets

METHOD AND SYSTEM FOR DETECTING RADAR SIGNALS

CROSS-REFERENCE TO RELATED APPLICATIONS

The present application claims priority of U.S. patent provisional application No. 60/680, 467, filed on May 12, 2005, the full disclosures of which is incorporated herein by reference.

FIELD OF INVENTION

The present invention generally relates to radio communication technology, and more specifically to detecting radar signals.

BACKGROUND OF THE INVENTION

Some radio systems, including the 5 GHz Radio Local Area Networks (RLANs), sometimes referred to as Wireless Local Area Networks (WLANs), use radio spectrum bands that are shared with other services including RADARs. This sharing requires that the radio communications equipment must detect the operation of nearby RADAR systems, and stop using the channels if a RADAR signal is detected. The band sharing procedures are defined in the ITU-R WRC-03 Resolution 229 and ITU-R Recommendation M1652. These texts are supplemented by additional national and regional regulations for sharing and equipment testing (e.g. ETSI EN301-893 for the EU).

The method that has been endorsed by the ITU agreements to facilitate sharing between the radio communications and RADAR services is referred to as Dynamic Frequency Sharing (DFS) (e.g. ITU-R Recommendation M1652 and ETSI standard EN301-893). The ITU outlines a method and conditions for detecting periodic RADAR signals based on RADAR signal strength threshold, pulse width and periodicity.

The initial WRC-03 set an upper limit of the RADAR pulse width of about 20 microseconds which is less than the typical length of the radio communications signal bursts. This, in principle, enabled the radio communications to distinguish RADAR signals from radio communications signals and other noise. However, new RADAR technology is using pulses much longer than 20 microseconds, since these provide some advantages for the RADAR system for resolution, sensitivity and range. These longer pulses are about the same length as the typical radio communications signals making more difficult the distinction between communications signal collisions and the RADAR signals.

A radio communications receiver will see many signals in its band/channel that may mimic the RADAR pulse width and strength. These false signals occur due to RF noise or the transmissions from other radio communications devices in the band, and radio communications receivers have trouble distinguishing a real RADAR pulse sequence from this other noise and activity. These extra signals may be radio communications signals, noise (i.e. thermal and man-made artificial) or collisions between two or more radio communications signals or collisions between radio communications signals and RADAR signals. The decision that a RADAR signal has been detected is thus ambiguous. As a result, a significant number of pulses must be observed to reduce the false detection probability to an acceptable level for the radio communications operation.

The ITU method was designed to detect "conventional" RADAR systems by distinguishing the RADAR signals due to their pulse width and their periodicity. These characteristics are not shared by noise or other radio communications traffic. The ITU method is suitable for commercial RADAR systems that utilize traditional revolving beam antennas and have regular pulse emissions. However, many RADARs use a variety of pulse formats, durations and repetition intervals either for operational reasons or a desire to be covert (i.e. hard to detect). These systems are aperiodic and may also change their pulse formats, modulation and timing often and in a seemingly random way (see for example the description of the SENRAD: An Advanced Wideband Air-Surveillance Radar, Skolnik et al.; Naval Research Laboratory, IEEE TRANSACTIONS ON AEROSPACE AND ELECTRONIC SYSTEMS VOL. 37, NO. 4 OCTOBER 2001, page 1163). Hence the radio communications receiver cannot use the periodicity and limited range of pulse widths as a reliable means to distinguish these RADAR signals Therefore, it is desirable to provide a method and system that is capable of better detecting conventional, variable and covert RADAR signals and of providing more reliable radio communications service.

SUMMARY OF THE INVENTION

It is an object of the invention to provide a method and system that obviates or mitigates at least one of the disadvantages of existing systems.

In accordance with an aspect of the present invention there is provided a system for detecting a RADAR signal in a communications network which utilizes signals different from the RADAR signal, which includes: a receiver for receiving a first pulse; a correlator for correlating the first pulse with a second pulse; and a detector for detecting, based on the correlation measurement, whether the first pulse is a RADAR pulse.

In accordance with a further aspect of the present invention there is provided a method of detecting a RADAR signal in a communications network which utilizes signals different from the RADAR signal, which includes the steps of: receiving a first pulse; correlating the first pulse with a second pulse; and detecting, based on the correlation measurement, whether the first pulse is a RADAR pulse.

Other aspects and features of the present invention will be readily apparent to those skilled in the art from a review of the following detailed description of preferred embodiments in conjunction with the accompanying drawings.

BRIEF DESCRIPTION OF THE DRAWINGS

These and other features of the invention will become more apparent from the following description in which reference is made to the appended drawings wherein.

DETAILED DESCRIPTION

Embodiments of the present invention describe using radio communications systems and RADAR systems. The radio communications systems may include, but not limited to, Radio Local Area Network (RLAN) communications systems which are also called Wireless Local Area Networks (WLANs). The embodiments of the present invention can be applicable to any communications network other than RLAN, which uses a certain frequency band/spectrum and may share that frequency band/spectrum with the RADAR system. The radio communications systems may be used for communications among fixed and mobile devices.

Figure 1:
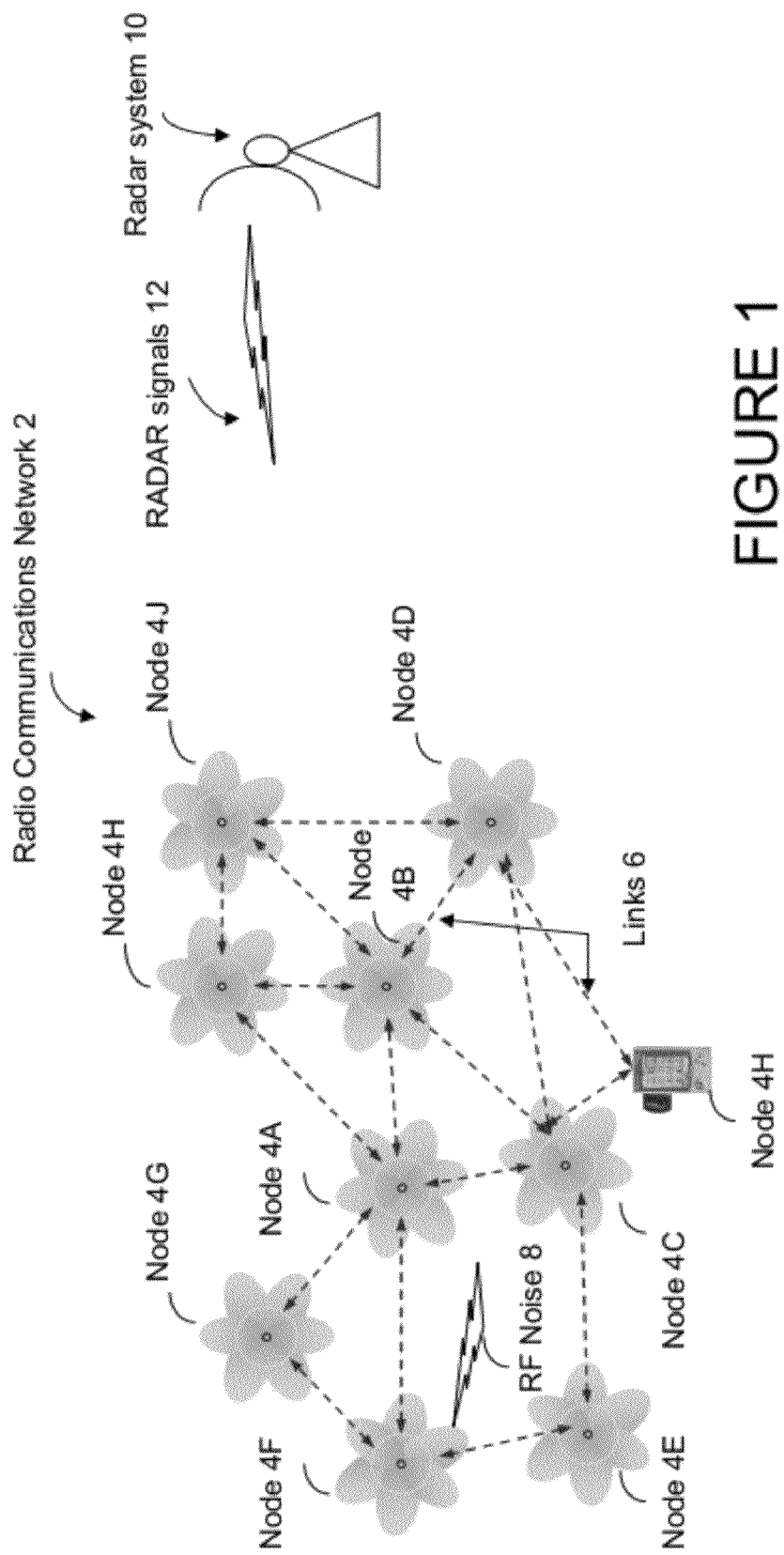
FIG. 1 illustrates a RADAR system and a radio communications network to which RADAR signals detection in accordance with an embodiment of the present invention is applied.

FIG. 1 illustrates a RADAR system 10 and a radio communications network 2 to which RADAR signal detection in accordance with an embodiment of the present invention is applied. In FIG. 1, a group of radio communications nodes 4A-4H is shown as forming the radio communications network 2. The radio communications nodes 4A-4H may be RLAN devices operating to form a radio communications system.

The radio communications node (i.e. 4A-4H) is an element of the radio communications network 2, which includes a radio transmitter and receiver ("transceiver") used for the communication of signals or information among nodes in the radio communications network 2 through radio communication links 6. The radio communications nodes may be a fixed or mobile. For example, the radio communications node 4H is a mobile node. The communication link 6 may be a wireless link, a wired link or a combination thereof, and may include, but not limited to, Ethernet, Internet, ATM, fibre or DSL connections.

The communication links 6 may experience noise and other interference both from signals such as noise signal 8 received from other external sources (not shown). As a result, the radio communications node may re-use channels within the radio communications network 2.

The RADAR system 10 transmits RADAR signals 12. The RADAR signals 12 may have a variety of signal formats, e.g. chirp, Barker codes, spread spectrum signals or other signals suitable for RADAR purposes. The operating area of the radio communications network 2 includes a part of the area of coverage for the RADAR system 10. The radio network's area may be completely within the RADAR area or only partly within the RADAR area.

The radio communications network 2 employs the RADAR signal detection that implements one or more measurements/observations and determines if a RADAR pulse/signal has been observed.

The RADAR signal detection may be implemented in one or more radio communications nodes in the radio communications network 2. The radio communications node having the function of the RADAR signal detection may scan for the RADAR signals 12. The RADAR signal detection may be integrated into the radio communications node. The detection result obtained in the radio communications node may be delivered to any other radio communications nodes.

The RADAR signal detection may be implemented by a dedicated device, separately from the radio communications nodes 4A-4H. The RADAR signal detection device may be located in a place chosen for better detection of the RADAR signals 12, and to communicate with the detection results to the radio communications nodes 4A-4H via communications scheme such as radio, fibre or wired links. For example, the RADAR signal detection device may be placed at the perimeter edge of the radio communications network 2. The RADAR signal detection device may scan for RADAR signals.

The RADAR signals 12 may be received almost simultaneously at more than one radio communications node, RADAR signal detection device, or combinations thereof. Accordingly, the RADAR signals 12 may be detected by combining more than one detection result. The simultaneous detection of the RADAR signals 12 and/or the detection of the RADAR signals 12 from the uniform direction may be used to confirm that the RADAR signals 12 originate from the RADAR system 10 and to reduce the probability of false detection.

The RADAR signal detection may be implemented in radio communications systems sharing radio bands with RADAR systems including systems such as RLANs and broadband radio distribution and backhaul systems in both fixed and/or mobile applications.

In FIG. 1, a particular configuration of the radio communications network 2 is shown. However, it is to be clearly understood that other configurations are possible. An arbitrary number and arrangement of the radio communications nodes and radio communication links may be employed.

In the description below, the RADAR signal detection is implemented by a radio communications receiver system in a radio communications node (e.g. 4A-4H), which receives radio communications signals through an antenna and decides a next action. The radio communications receiver system determines whether a received signal (e.g. pulse, burst) is a RADAR signal (e.g. RADAR pulse, RADAR burst) or noise or a disturbed radio communications transmission (collision). The radio communications receiver system may detect in-band RADAR signals for channel sharing. The radio communications receiver system will defer its use of the channel (band) based on the RADAR signal detection result(s).

Figure 2:
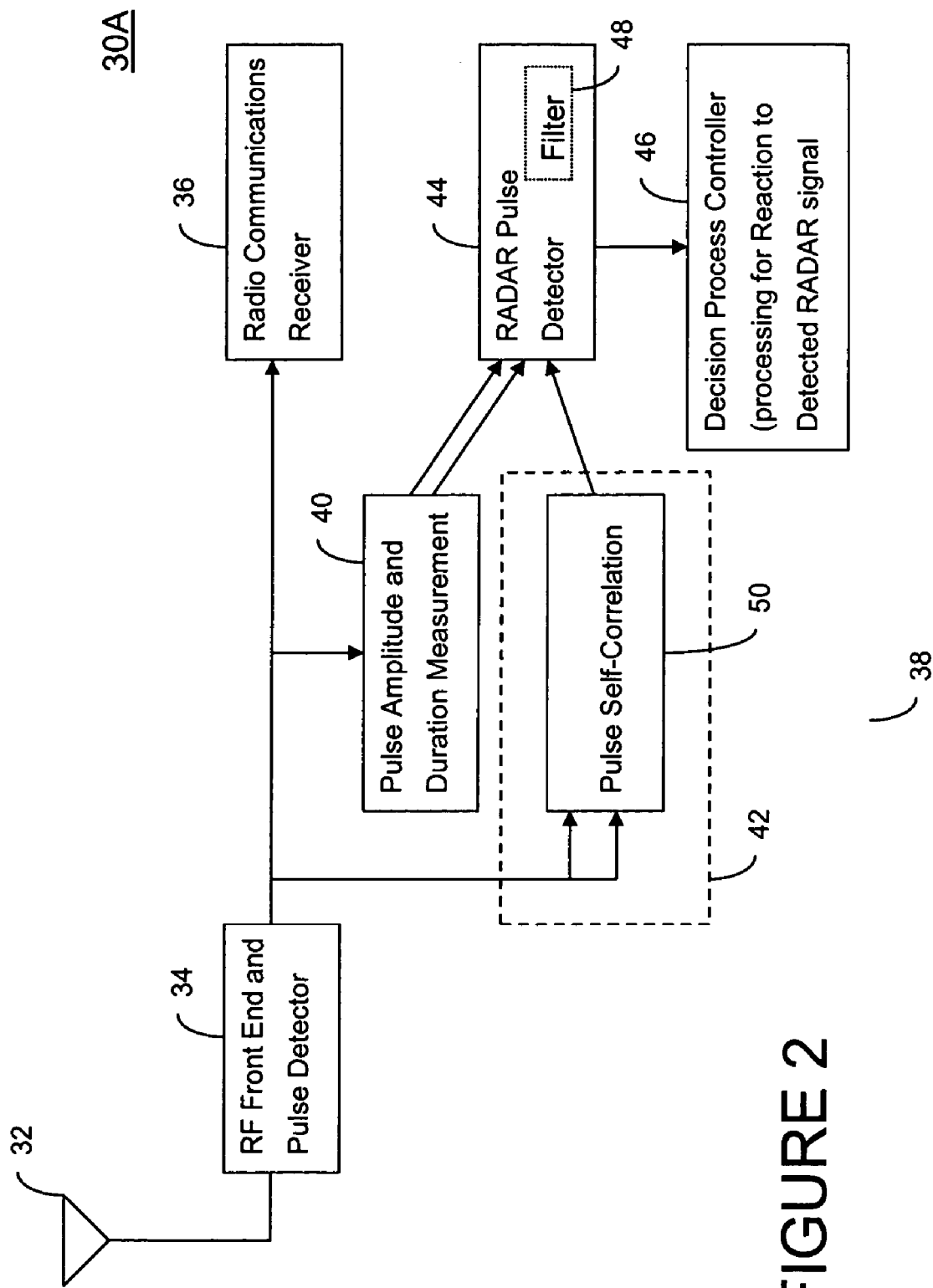
FIG. 2 illustrates a radio communications receiver system to which one example of the RADAR signal detection is applied.

FIG. 2 illustrates a radio communications receiver system 30A to which one example of the RADAR signal detection is applied. The radio communications receiver system 30A includes a radio communications device antenna 32, a RF front end and pulse detector 34, a radio communications receiver 36, a pulse examination module 38, a RADAR pulse detector 44, and a decision process controller 46. It is noted that the radio communications receiver system 30A may include any circuits other than those shown in FIG. 3.

The pulse examination module 38, the RADAR pulse detector 44 and the decision process controller 46 are integrated into the radio communications receiver system components. The pulse examination module 38, the RADAR pulse detector 44 and the decision process controller 46 may be implemented by a combination of hardware and software operating within a processor.

The antenna 32, the RF front end and pulse detector 34, and the radio communications receiver 36 are designed to detect and process radio communications signals.

The pulse examination module 38 examines/observes characteristics of pulses output from the RF front end pulse detector 34. The pulse examination module 38 includes a pulse amplitude and duration measurement circuit 40 and a correlation system 42 for correlation measurement. The pulse amplitude and duration measurement circuit 40 measures the amplitude and duration of the signal detected by the RF front end and pulse detector 34. The measurement is provided to the RADAR pulse detector 44. The correlation system 42 includes a self-correlator 50 which implements self-correlation.

The RADAR pulse detector 44 receives the measurement by the correlation system 42, the measurement by the pulse amplitude and duration measurement circuit 40, or a combination thereof. Based on the measurements available, the RADAR pulse detector 44 determines that the pulse examined is a (possible, real) RADAR pulse, noise or radio communications system signal collision. This may involve looking for patterns in received pulse sequences and coordinating the actions of the various measurements functions (e.g. 40, 42). The various measurements functions may include the function of a memory system. The RADAR pulse detector 44 may detect a RADAR pulse burst or a RADAR pulse pattern. The RADAR pulse detector 44 may discard non-RADAR signals that fail to meet RADAR-requirements (e.g. a threshold). The detection result by the RADAR pulse detector 44 or one or more measurements may be provided to any other radio communications node in the radio communications network (e.g. 2 of FIG. 1). The RADAR pulse detector 44 may detect the RADAR pulse/signal using information from any other radio communications nodes.

The decision process controller 46 functions to coordinate the actions of the radio communications node in response to the RADAR signal observation (e.g. change to a new channel), and to coordinate the RADAR detection with other nodes of the radio communications network (e.g. 2 of FIG. 1). The decision process controller 46 initiates a process/action in the radio communications node and/or initiates a process/action for any other radio communications nodes or any other RADAR signal detection devices in the radio communications network, if a RADAR pulse or burst is detected.

The RADAR pulse detector 44 may include a filter 48 for filtering the detected pulses according to the regulations for their amplitude and time sequence. The filter 48 may be in the decision process controller 46.

In the description, the term "possible RADAR pulse (signal)" and "Likely a RADAR pulse (signal)" may be used interchangeably.

The decision process controller 46 may communicate with any dedicated device(s) for the RADAR signal detection in the radio communications network (e.g. 2 of FIG. 1). The RADAR signal observation or RADAR signal/pulse detection result may be provided by any other radio communications node(s) or dedicated devices for the RADAR signal detection.

Radio communication signal collisions occur when two (or more) of the radio communications nodes send signals at the same time. Such collisions manifest themselves at the radio communications receiver system as a signal with errors or which the radio communications receiver system is otherwise unable to extract the intended information sent by the sender.

The RADAR pulse detector 44 determines the occurrence of the collisions when a signal with errors is observed or when the radio communications receiver system is otherwise unable to extract the intended information sent by the sender.

The pulse examination module 38 is described in detail. RADAR waveforms are typically designed to provide pulse compression to improve the RADAR system range and to improve the spatial resolution of the RADAR target detection. Using pulse compression provides a way to use a longer duration pulse that provides more energy for reflection from the target and hence increases the range of detection. The pulse compression waveforms are specially designed to have the property of a low self-correlation except at zero time offset. Their self-correlation is lower than for noise or for general modulation signals. In particular the self-correlation at various time offsets from zero is typically lower than a noise signal, a signal collision or a radio communications signal burst.

For example, an FM chirp waveform is one in which the frequency of the RADAR signal sweeps over a range (i.e. from 2.5 MHz below the channel centre frequency to 2.5 MHz above) from the beginning to the end of the pulse interval. The frequency modulation is often a linear sweep, however, non-linear sweeps are also used to improve RADAR channel spectral occupancy.

Barker codes and similar digital spreading codes are examples of pulse compression techniques used in the RADAR systems. Barker codes are subsets of PN sequences and are commonly used for pulse compression or synchronization in digital communication systems. Barker codes have length at most 13 and have low correlation side-lobes. For longer code lengths, codes can be constructed with similar low self-correlation properties. A correlation side-lobe is the correlation of a codeword with a time-shifted version of itself. The correlation side-lobe, $C_k$, for a k-symbol shift of an N-bit code sequence $X_j$ is given by:

$$C_k = \sum_{j=1}^{N-k} X_j X_{j+k}$$

where $X_j$ is an individual code symbol taking values +1 or −1 for j=1, 2, 3, ..., N, and the adjacent symbols are assumed to be zero.

The Barker sequences for a number of lengths between 2 and 13 is shown in the following table:

TABLE 1

| Code Length | Barker Code | |
|---|---|---|
| 2 | [−1 1] | Deleted:- |
| 3 | [−1 −1 1] | Deleted:- |
| 4 | [−1 −1 1 −1] | Deleted:- |
| 5 | [−1 −1 −1 1 −1] | Deleted:- |
| 7 | [−1 −1 −1 1 1 −1 1] | Deleted:- |
| 11 | [−1 −1 −1 1 1 1 −1 1 1 −1 1] | Deleted:- |
| 13 | [−1 −1 −1 −1 −1 1 1 −1 −1 1 1 −1 1] | Deleted:- |

Figure 3:
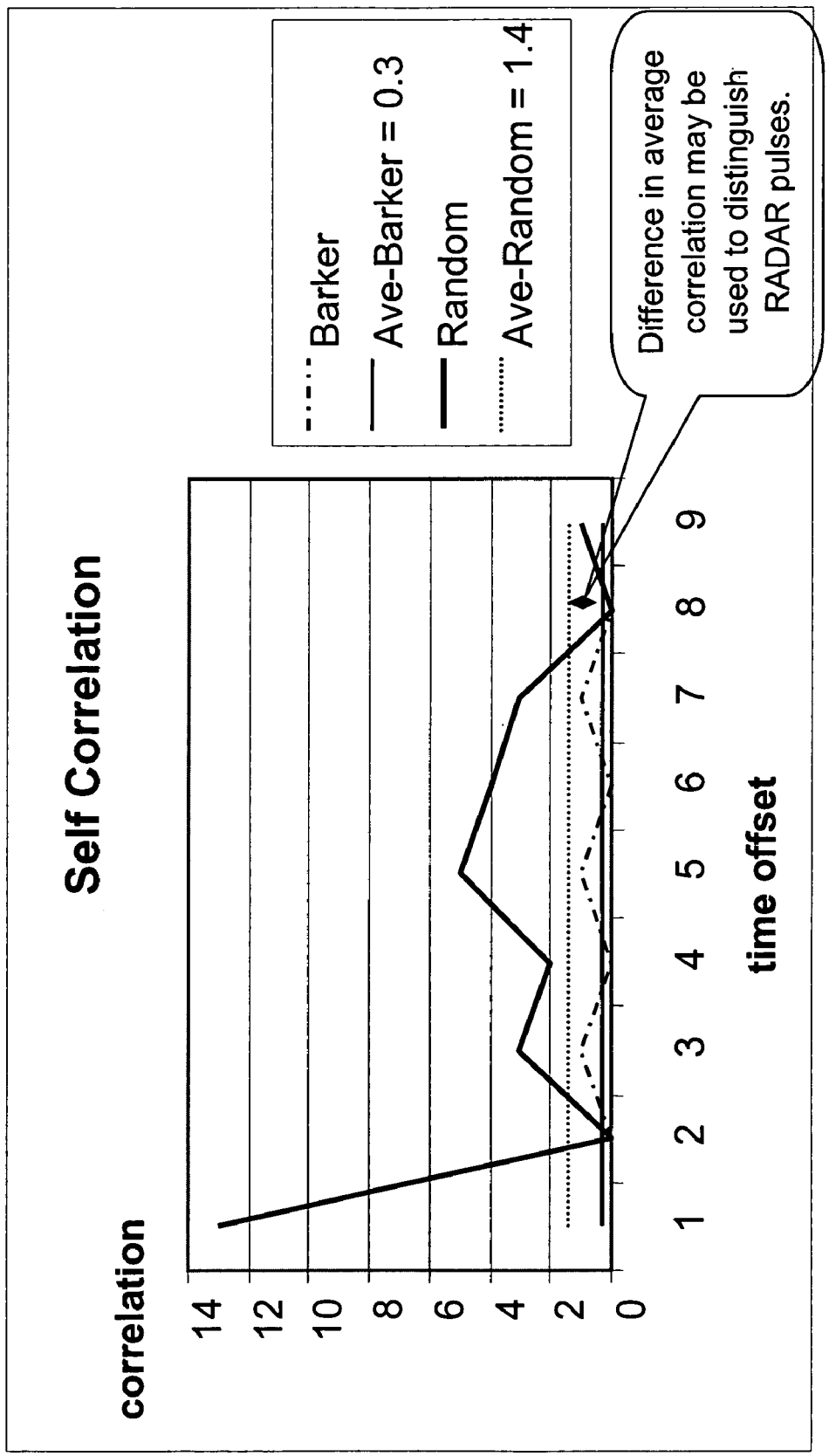
FIG. 3 illustrates an example of self-correlation of Barker sequence compared to a Random sequence.

FIG. 3 illustrates an example of self-correlation of Barker sequence compared to a Random sequence. Symbols beyond the pulse sequence are assumed to be zero. In FIG. 2, the correlation of a Barker sequence of length 13 with itself at time offsets from 0 to 8 and the correlation of a random sequence of length 13 with itself at time offsets from 0 to 8 is shown as an example. The average of the magnitude of the correlation at non-zero time offsets is 0.3 for the Barker sequence and 1.4 for the random sequence.

The random signal has a higher self-correlation for non-zero time offsets than the Barker sequence. Thus, based on the difference in the average of the magnitude of the correlation, a pulse, which has been deliberately designed to have low self-correlation at non-zero time offsets is distinguishable from a random signal.

Referring to FIG. 2, the self-correlator 50 correlates the samples of the received pulse with themselves at one or more non-zero time offsets. The RADAR pulse detector 44 compares the self-correlation measurement with a threshold. A real RADAR signal will have an autocorrelation lower than that of noise except for zero time offset. Thus, the threshold may be set from the expected correlation of noise.

The average offset correlation may be calculated by the self-correlator 50 based on correlation with several offsets in time. This is to avoid peaks in the signal's autocorrelation, to reduce the effects of side-lobes or time variability in the correlation, and to allow for the difference in symbol rates between the radio communications receiver system sampling and the RADAR modulation rate.

The RADAR pulse detector 44 may compare the average offset correlation with a threshold. For example, the threshold may be set from the average of the self-correlation of number of random sequences. The threshold may be set just below the average of the self-correlation of random sequences.

If the pulse has the average of self-correlation, which is less than the threshold, it may be identified as a possible RADAR pulse. It may be identified as a non-RADAR pulse if it is equal to or greater than the threshold.

To account for the difference in correlation value that occurs between pulses of different lengths, the self-correlation measure may be normalized. The self-correlation at zero time offset measures the maximum correlation of the signal. Thus, the self-correlation measure may be normalized by computing the ratio of the non-zero offset average divided by the zero-offset correlation. The normalization allows for different pulse durations and amplitudes.

The RADAR pulse detector 44 may compare the normalized self-correlation with a threshold. For example, this threshold may be set from the average of the normalized self-correlation of a number of random sequences. The threshold may be set just below the average of normalized self-correlation of random sequences.

The average self-correlation measured for non-zero offsets may be reported as a fraction of the zero-offset measurement.

If the pulse has a normalized average self-correlation less than a threshold, it may be identified as a possible RADAR pulse. It may be identified as a non-RADAR pulse if it is equal to or greater than the threshold.

If all of the available measurements meet a requirement of a RADAR signal, it may be identified as a real RADAR pulse. For example, the RADAR pulse detector 44 may determine that the examined pulse is a real RADAR pulse only if it exceeds the regulatory pulse amplitude, has a pulse duration within the regulatory parameter range, and has a self-correlation less than a threshold.

The pulse self-correlator 50 may be implemented using a correlator circuit provisioned to permit correlation at several time offsets with the outputs coupled to an arithmetic circuit to compute the average and the ratio with the zero-offset correlation. These operations may be, advantageously in terms of speed, performed in special purpose circuitry, such as one or more digital signal processors (DSPs) or application-specific integrated circuits (ASICs), or as a sequence of operations in a general purpose arithmetic processor.

Figure 4:
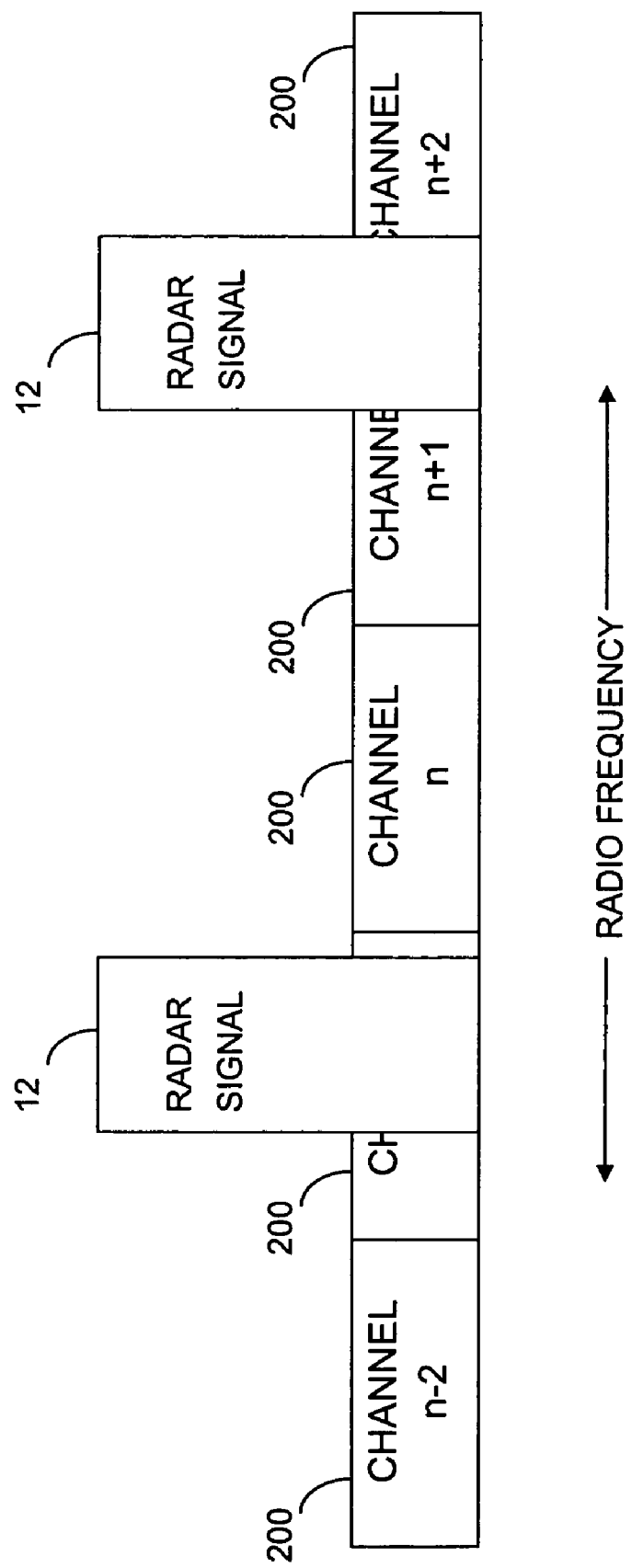
FIG. 4 illustrates an example of an overlap of the RADAR signals of FIG. 1 and the radio communications channels used by the radio communications network of FIG. 1.

As described above, the RADAR signal detection may be implemented for channel sharing. FIG. 4 illustrates an example of an overlap of the RADAR signals 12 of FIG. 1 and the radio communications channels used by the radio communications network 2 of FIG. 1. Referring to FIGS. 1 and 4, RADAR transmissions from the RADAR system 10 may have a different channel plan than transmissions from the radio communications network 2. The RADAR signal 12 may overlap one or more radio communications channels. In FIG. 4, each RADAR signal 12 overlaps multiple radio communications channels 200. Detection of the channels 200 being blocked by the RADAR signals 12 allows a radio communications network 2 to avoid using these blocked channels and make use of other channels to avoid deleterious effects of the RADAR signals.

Figure 5:
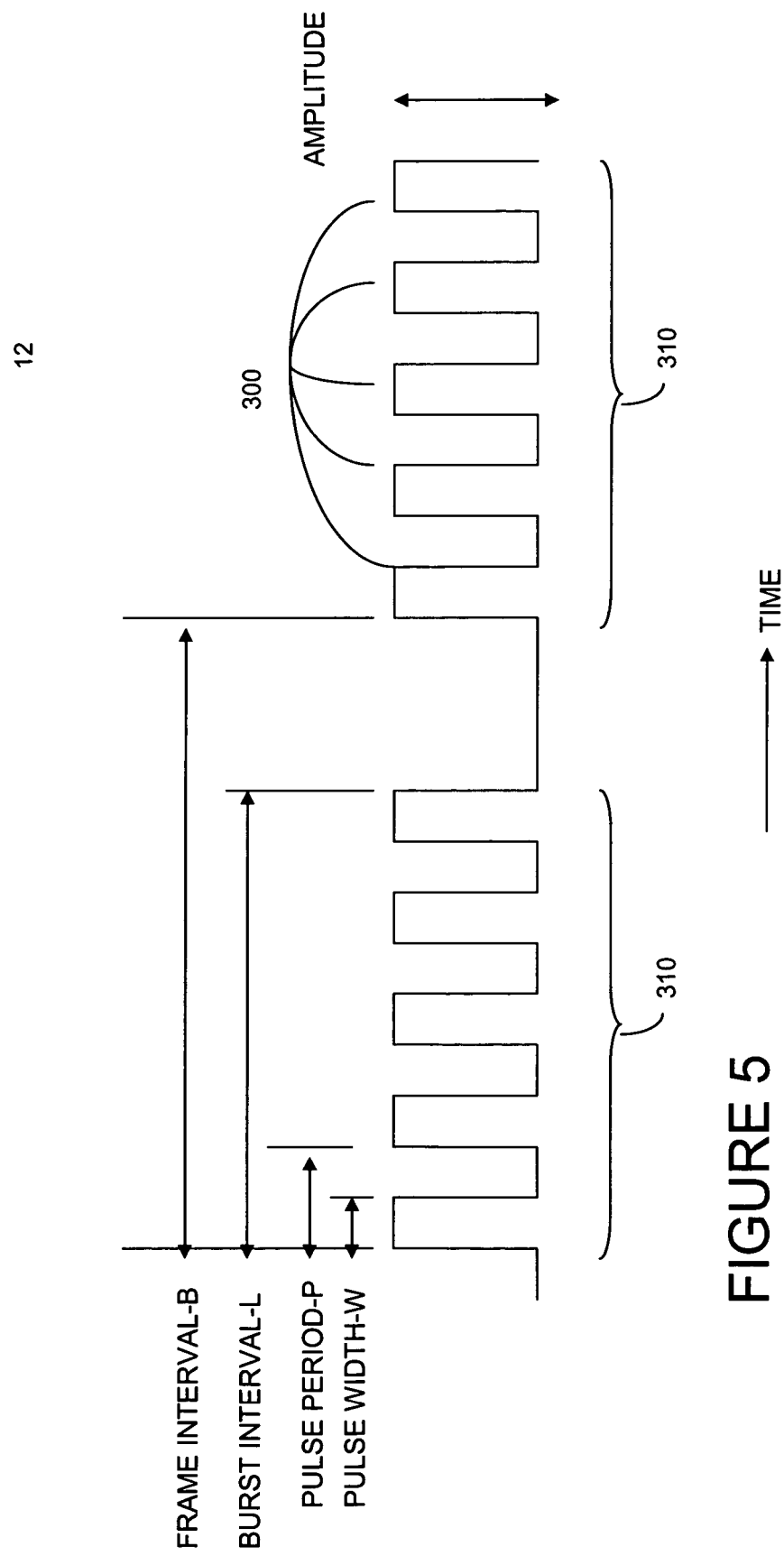
FIG. 5 illustrates an example of a format of one of the RADAR signals of FIG. 1, which is to be detected by pattern matching.

As described above, the RADAR pulse detector 44 may implement pattern matching. The RADAR pulse detector 44 collects measurement information and implements the pattern matching. FIG. 5 illustrates an example of a format of one of the RADAR signals 12 of FIG. 1, which is to be detected by the pattern matching. The RADAR signal 12 includes a short burst 310 of pulses 300 with a burst interval L. The bursts 310 are repeated with a frame interval B. The pulses have a pulse width W and a pulse period P. The pulse width may be between 1 and 100 microseconds in duration with the pulse period P in the range between 250 microseconds and 5 milliseconds. The frame intervals may vary between 2 and 60 seconds and the pulse bursts 310 may contain between 5 and 20 pulses, five pulses 300 being shown for each pulse burst as an example. The format of the RADAR signal 12 is not limited to that of FIG. 5.

For the pattern matching, each newly received pulse is logged, and then the pattern matching process examines the log to see if a pattern is emerging (or has emerged). The log information may also be shared with any other radio communications nodes. For the pattern matching, a storage memory may be provided to store a pulse pattern. The storage memory may be integrated with the RADAR pulse detector 44. The storage memory may be similar to those of FIGS. 8 and 9.

Figure 6:
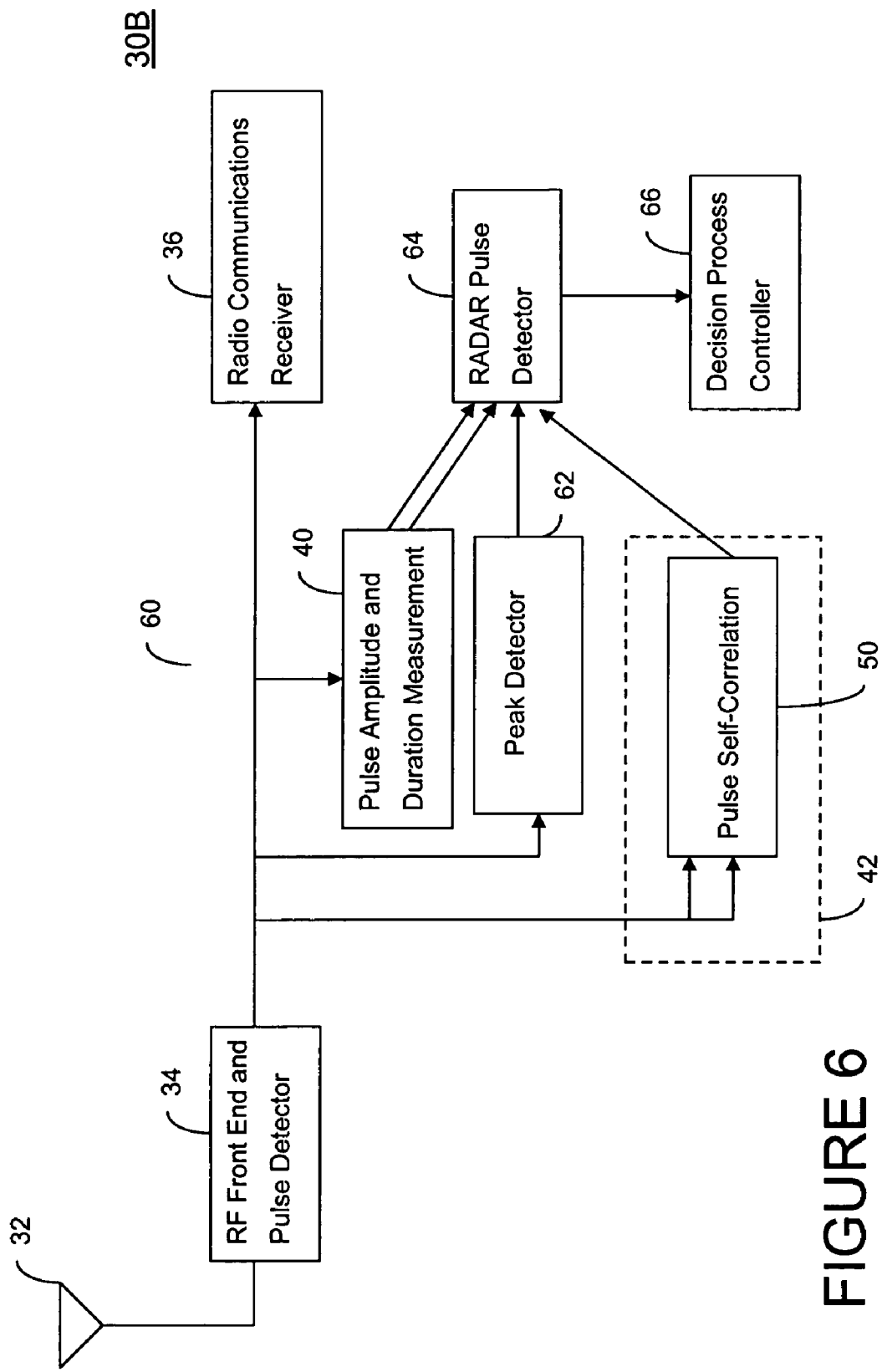
FIG. 6 illustrates a radio communications receiver system to which a further example of the RADAR signal detection is applied.

A peak detector may be provided to examine pulses as shown in FIG. 6. FIG. 6 illustrates a radio communications receiver system 30B to which a further example of the RADAR signal detection is applied. The radio communications receiver system 30B includes the radio communications device antenna 32, the RF front end and pulse detector 34, the radio communications receiver 36, a pulse examination module 60, a RADAR pulse detector 64, and a decision process controller 66. It is noted that the radio communications receiver system 30B may include any circuits other than those shown in FIG. 6.

The pulse examination module 60, the RADAR pulse detector 64 and the decision process controller 66 are integrated into the radio communications receiver system components. The pulse examination module 60, the RADAR pulse detector 64 and the decision process controller 66 may be implemented by a combination of hardware and software operating within a processor.

The pulse examination module 60 examines/observes characteristics of pulses output from the RF front end pulse detector 34. The pulse examination module 60 includes the pulse amplitude and duration measurement circuit 40, the correlation system 42 and a peak detector 62. The peak detector 62 detects the peak of pulses output from the RF front end and pulse detector 34. For example, the peak detector 62 may use a one microsecond response filter as specified by the ITU Recommendations.

The RADAR pulse detector 64 is similar to the RADAR pulse detector 44 of FIG. 2. The RADAR pulse detector 64 receives the measurement by the correlation system 42, the measurement by the pulse amplitude and duration measurement circuit 40, the measurement by the peak detector 62, or combinations thereof. Based on the measurements available, the RADAR pulse detector 44 determines that the pulse examined is a (possible, real) RADAR pulse, noise or radio communications system signal collision. This may involve looking for patterns in received pulse sequences and coordinating the actions of the various measurements functions (e.g. 40, 42, 62). The various measurements functions may include the function of a memory system. The RADAR pulse detector 64 may detect a RADAR pulse burst or a RADAR pulse pattern. The RADAR pulse detector 64 may discard non-RADAR pulses that fail to meet RADAR-requirements (e.g. threshold). The detection result by the RADAR pulse detector 64 or one or more measurements may be provided to any other radio communications node in the radio communications network (e.g. 2 of FIG. 1). The RADAR pulse detector 64 may detect the RADAR pulse/signal using information from any other radio communications nodes.

The decision process controller 66 is similar to the decision process controller 46 of FIG. 2. The decision process controller 66 functions to coordinate the actions of the radio communications node in response to the RADAR signal observation (e.g. change to a new channel), and to coordinate the RADAR detection with other nodes of the communications network (e.g. 2 of FIG. 1). The decision process controller 66 initiates a process/action in the radio communications node and/or initiates a process/action for any other radio communications nodes or any other RADAR signal detection devices in the radio communications network, if a RADAR pulse or burst is detected. The decision process controller 66 may communicate with any dedicated device(s) for the RADAR signal detection in the radio communications network. The RADAR signal observation or RADAR signal/pulse detection result may be provided by any other radio communications node(s) or dedicated devices for the RADAR signal detection.

The peak detector 62 may detect the peak of burst during all time including reception of radio communications data format. The detected peak may be compared with a threshold. The RADAR pulse detector 64 may determine whether the peak of the interfering signal exceeds the threshold for the detections set by the regulations. This avoids any ambiguity that may exist when a RADAR signal collides with a radio communications transmission. Pulses that are below the threshold may be dismissed as noise by the RADAR pulse detector 64.

The peak detector 62 may measure the pulse duration. Pulses that are shorter or longer than the RADAR signals defined in the regulations may be dismissed as noise by the RADAR pulse detector 64.

In FIG. 6, the peak detector 62 is shown separately from pulse amplitude and duration measurement circuit 40. However, the peak detector 62 may also be included as an additional capability of the pulse amplitude and duration measurement circuit 40.

The typical radio communications signals sent among the radio communications nodes include a header, or other standardized signature signal that identifies the format of the communications transmission. A detector for these headers or other standardized signature may be provided to examine pulses as shown in FIG. 6.

Figure 7:
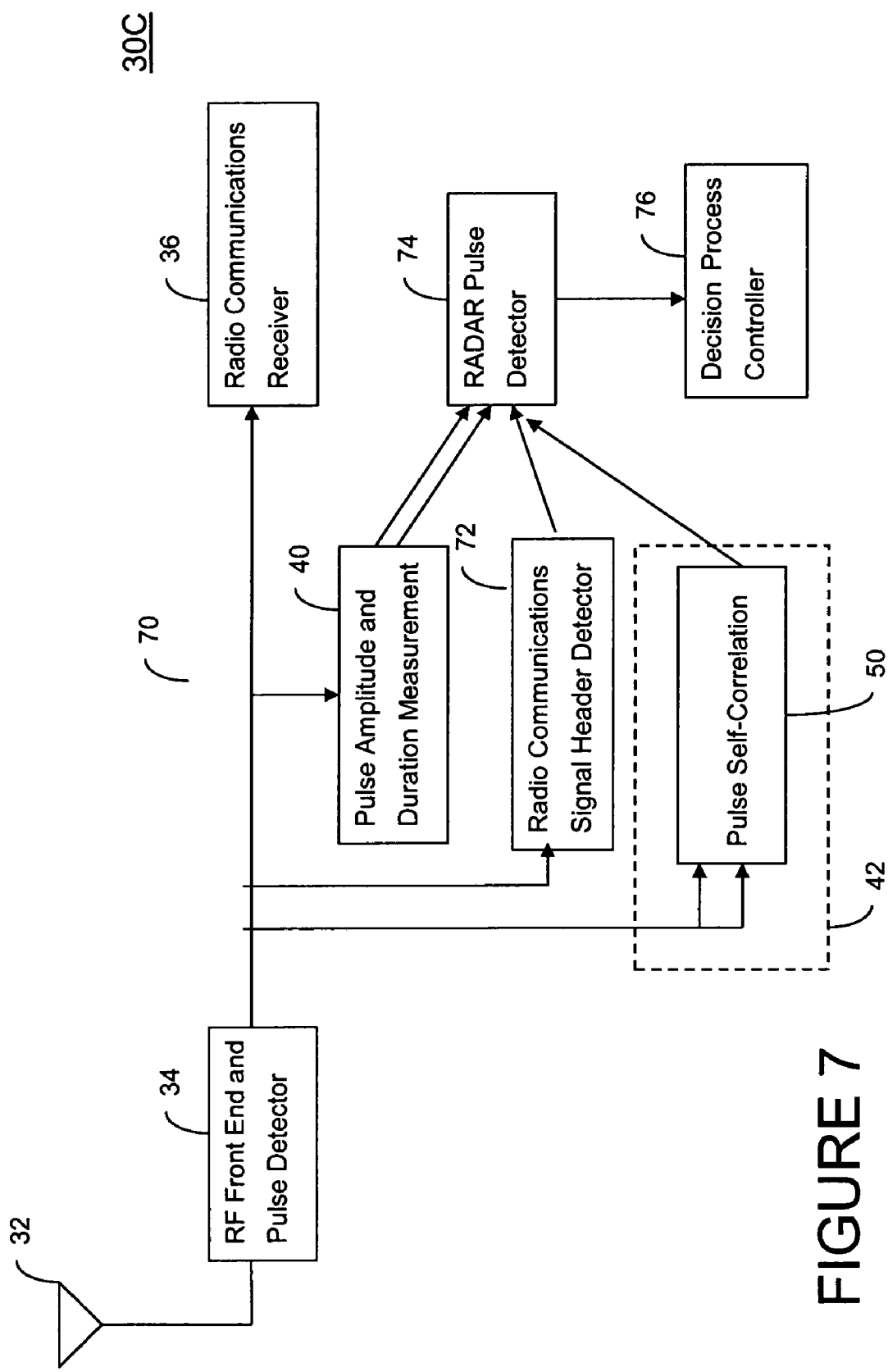
FIG. 7 illustrates a radio communications receiver system to which a further example of the RADAR signal detection is applied.

FIG. 7 illustrates a radio communications receiver system 30C to which a further example of the RADAR signal detection is applied. The radio communications receiver system 30C includes the radio communications device antenna 32, the RF front end and pulse detector 34, the radio communications receiver 36, a pulse examination module 70, a RADAR pulse detector 74, and a decision process controller 76. It is noted that the radio communications receiver system 30C may include any circuits other than those shown in FIG. 7.

The pulse examination module 70, the RADAR pulse detector 74 and the decision process controller 76 are integrated into the radio communications receiver system components. The pulse examination module 70, the RADAR pulse detector 74 and the decision process controller 76 may be implemented by a combination of hardware and software operating within a processor.

The pulse examination module 70 examines/observes characteristics of pulses output from the RF front end pulse detector 34. The pulse examination module 70 includes the pulse amplitude and duration measurement circuit 40, the correlation system 42 and a radio communications signal header detector 72. The radio communications signal header detector 72 detects a radio communications signature preamble/header.

The combination of the peak detector 62 of FIG. 6 and the radio communications header detector 72 of FIG. 7 may be provided with the correlation system 42. The peak detector 62 may be included in the pulse amplitude and duration measurement circuit 40.

For RLAN systems/devices using the common IEEE 802.11 or 802.16 standard, each radio communications signal contains a preamble signature defined in the standard. If the system/device does not use the 802.11 or 802.16 standard for transmissions, it may detect/examine the preamble signature that is part of its waveform format.

The radio communications receiver systems may detect/examine multiple radio communications signal format signatures (e.g. 802.11 and 802.16) to be sensitive to multiple sources of radio communications traffic. If the communications band is used by radio systems of several different formats, the header detector 72 may preferably be arranged to detect any of the multiple headers and so enable all of these signals to be dismissed as non-RADAR signals.

The RADAR pulse detector 74 is similar to the RADAR pulse detector 44 of FIG. 2. The RADAR pulse detector 74 receives the measurement by the correlation system 42, the measurement by the pulse amplitude and duration measurement circuit 40, the detection result from the radio communications header detector 72, or combinations thereof, and determines that the pulse examined is a (possible, real) RADAR pulse, noise or radio communications system signal collision. This may involve looking for patterns in received pulse sequences and coordinating the actions of the various measurements functions (e.g. 40, 42, 72). The various measurements functions may include the function of a memory system. The RADAR pulse detector 74 may detect a RADAR pulse burst or a RADAR pulse pattern. The RADAR pulse detector 74 may discard non-RADAR pulses that fail to meet RADAR-requirements (e.g. threshold). The detection result by the RADAR pulse detector 74 or one or more measurements may be provided to any other radio communications node in the radio communications network (e.g. 2 of FIG. 1). The RADAR pulse detector 74 may detect the RADAR pulse/signal using information from any other radio communications nodes.

Received signals that include a recognizable header may be dismissed by the RADAR detector 64 as non-RADAR signals even though they may be otherwise incompletely received signals. The signals may be incompletely received due to noise, radio transmission conditions or collision with other radio communications signals.

If all of the measurements meet a requirement of a RADAR signal, it may be identified as a real RADAR pulse. For example, the RADAR pulse detector 64 may determine that the examined pulse is a real RADAR pulse only if it exceeds the regulatory pulse amplitude, has a pulse duration within the regulatory parameter range, does not contain the standard radio communications burst preamble signature, and has a self-correlation less than a threshold.

The decision process controller 76 is similar to the decision process controller 76 of FIG. 2. The decision process controller 76 functions to coordinate the actions of the radio communications node in response to the RADAR signal observation (e.g. change to a new channel), and to coordinate the RADAR detection with other nodes of the radio communications network (e.g. 2 of FIG. 1). The decision process controller 76 initiates a process/action in the radio communications node and/or initiates a process/action for any other radio communications nodes or any other RADAR signal detection devices in the radio communications network, if a RADAR pulse or burst is detected. The decision process controller 76 may communicate with any dedicated device(s) for the RADAR signal detection in the radio communications network (e.g. 2 of FIG. 1). The RADAR signal observation or RADAR signal detection result may be provided by any other radio communications node(s) or dedicated devices for the RADAR signal detection.

The RADAR signal detection may be implemented using a correlator which correlates the received signal with one or more previously received pulses, one or more predefined RADAR pulse patterns (e.g. linear FM chirps, Barker sequences) or combinations thereof. This may be done for different channels and multiple RADAR systems in the area. As there may be multiple RADAR systems in the area, operating on different channels shared with the radio communications system, the RADAR signal detection may store multiple different patterns for comparison across multiple channels. A storage memory is provided to implement this correlation as shown in FIG. 8 or 9.

Figure 8:
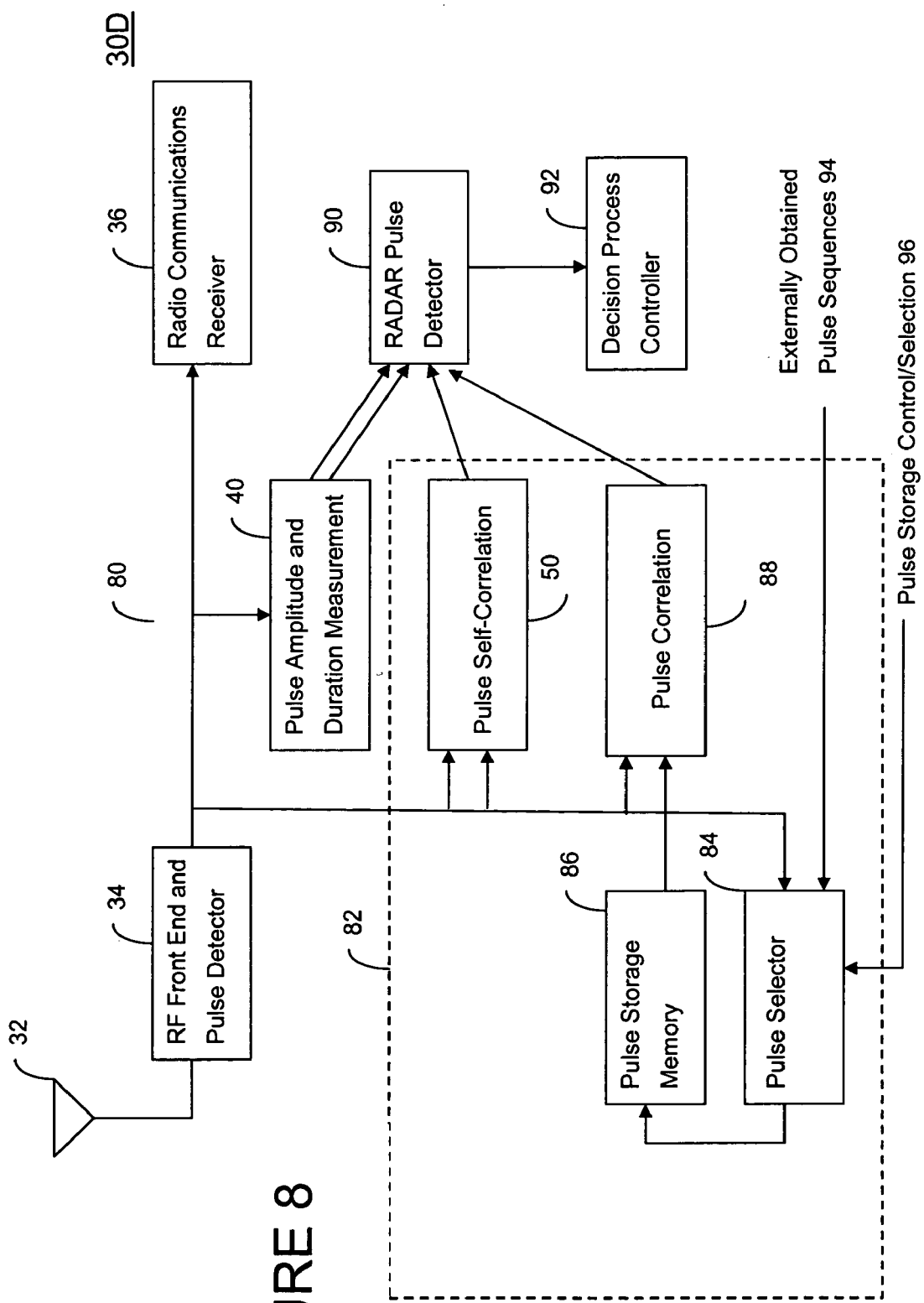
FIG. 8 illustrates a radio communications receiver system to which a further example of the RADAR signal detection is applied.
Figure 9:
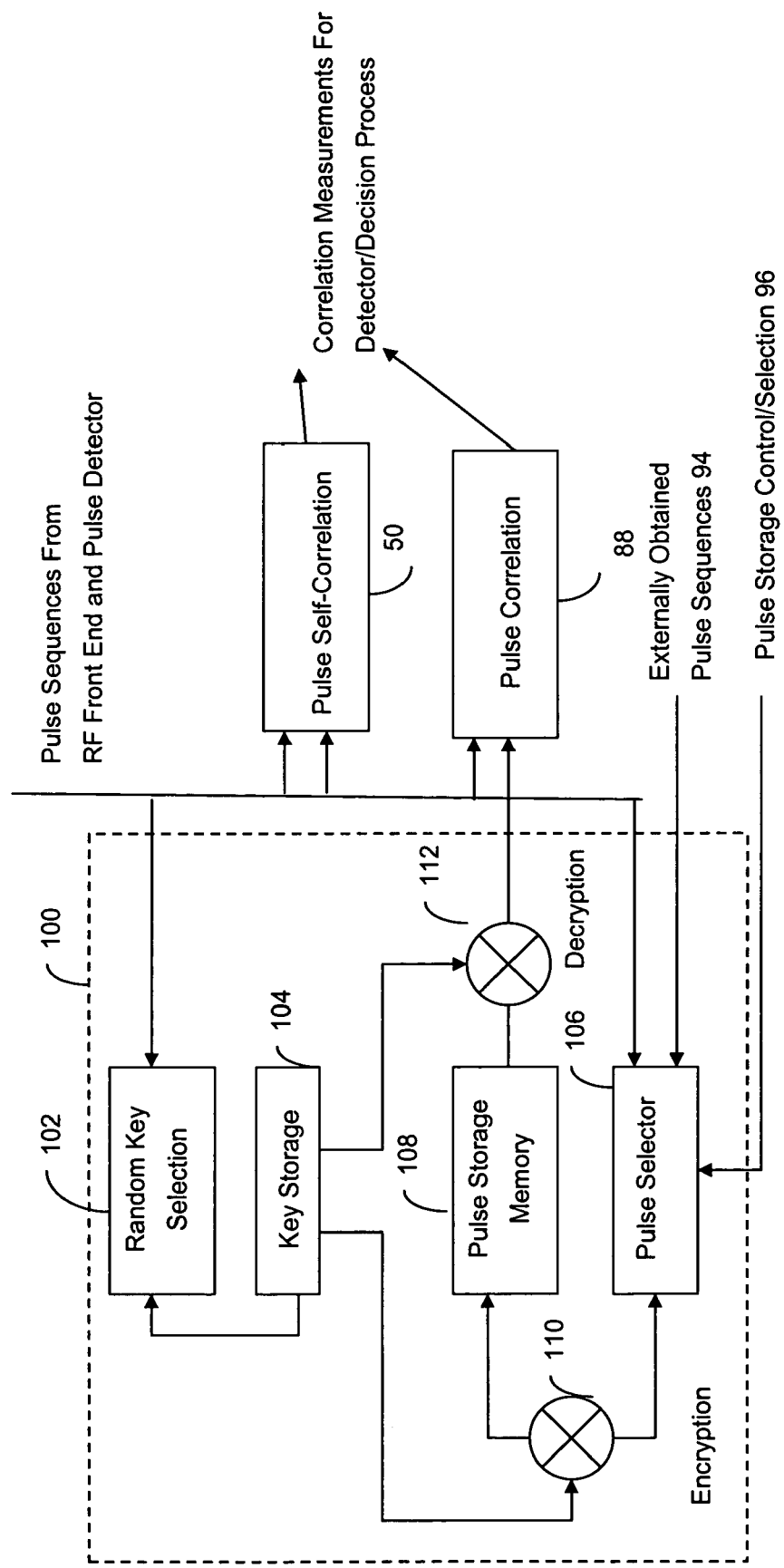
FIG. 9 illustrates one example of a storage unit where information is securely stored.

FIG. 8 illustrates a radio communications receiver system 30D to which a further example of the RADAR signal detection is applied. The radio communications receiver system 30D is capable of implementing the self-correlation as discussed above, and is also capable of correlating with one or more previously received pulses, one or more predefined RADAR waveforms, or a combination thereof. It may correlate a pulse with partial and various offsets of previous bursts.

The radio communications receiver system 30D includes the radio communications device antenna 32, the RF front end and pulse detector 34, the radio communications receiver 36, a pulse examination module 80, a RADAR pulse detector 90, and a decision process controller 92. It is noted that the radio communications receiver system 30D may include any circuits other than those shown in FIG. 8.

The pulse examination module 80, the RADAR pulse detector 90 and the decision process controller 92 are integrated into the radio communications receiver system components. The pulse examination module 80, the RADAR pulse detector 90 and the decision process controller 92 may be implemented by a combination of hardware and software operating within a processor.

The pulse examination module 80 includes the pulse amplitude and duration measurement circuit 40 and a correlation system 82. The correlation system 82 includes a pulse selector 84, a pulse storage memory 86, a pulse correlator 88 in addition to the pulse self-correlator 50.

The combination of the peak detector 62 of FIG. 6 and the header detector 72 of FIG. 7 may be provided with the correlation system 82. The peak detector 62 may be included in the pulse amplitude and duration measurement circuit 40.

The pulse storage memory 86 is capable of storing pulses output from the RF front end and pulse detector 34, and externally obtained pulse sequences 94. The signal patterns may be stored into the pulse storage memory 86 during manufacture. Pulse waveforms/sequences of interest may be stored in the pulse storage memory 86 at any time. A library of "interesting" RADAR waveforms may be developed in the pulse storage memory 86.

The pulse data stored in the pulse storage memory 86 are subsequently used to correlate with later received pulses. The pulse correlator 88 correlates pulses from the RF front end and pulse detector 34 with one or more RADAR pulses stored in the pulse storage memory 86.

The externally obtained pulse sequences 94 may be originated from pulses detected by any other radio communications nodes, dedicated devices or radio communications systems, or may be provided by any other means, such as a computer or communications apparatus directly or indirectly connected to the radio communications receiver system 30D.

The externally obtained pulse sequences 94 include predefined/known RADAR waveforms. The externally obtained pulse sequences 94 may include, but not limited to, waveforms for civilian RADAR installations (e.g. airport surveillance, route tracking and weather RADARS). The externally obtained pulse sequences 94 may, but not limited to, pulse waveforms that are considered to be RADAR pulses, such as a linear FM chirp, Barker sequences, and frequency hopping patterns for frequency hopping RADARs.

The pulse selector 84 selectively stores pulses output from the RF front end and pulse detector 34 or externally obtained pulse sequences 94 into the pulse storage memory 86 in response to a pulse storage control/selection signal 96.

A controller which generates the pulse storage control/selection signal 96 may be in the radio communications receiver system 30D. Pulses or burst patterns, which have low self-correlation, may be stored in the pulse storage memory 86. The pulse storage control/selection signal 96 may be received from any other radio communications nodes.

Information from other sources, such as the pulse timing pattern, or confirmation from other cooperating radio communications devices may be used to trigger the storage of a pulse waveform into the pulse storage memory 86.

The externally obtained pulse sequences 94 may be directly stored in the pulse storage memory 86 to permit fast and accurate recognition of these signals even from a single pulse.

The RADAR pulse detector 90 is similar to the RADAR pulse detector 44 of FIG. 2. The RADAR pulse detector 90 receives the measurement from the pulse amplitude and duration measurement circuit 40, the measurement from the pulse self-correlator 50, the measurement from the pulse correlator 88 or combinations thereof, and determines that the pulse examined is a (possible, real) RADAR pulse, noise or radio communications system signal collision. This may involve looking for patterns in received pulse sequences and coordinating the actions of the various measurements functions (e.g. 40, 50, 84, 86, 88, 100 of FIG. 9). The various measurements functions may include the function of any other memory system. The RADAR pulse detector 90 may detect a RADAR pulse burst or a RADAR pulse pattern. The RADAR pulse detector 90 may discard non-RADAR pulses that fail to meet RADAR-requirements (e.g. threshold). The detection result by the RADAR pulse detector 90 or one or more measurements may be provided to any other radio communications node in the radio communications network (e.g. 2 of FIG. 1). The RADAR pulse detector 90 may detect the RADAR pulse/signal using information from any other radio communications nodes.

The decision process controller 92 is similar to the decision process controller 46 of FIG. 2. The decision process controller 92 functions to coordinate the actions of the radio communications node in response to the RADAR signal observation (e.g. change to a new channel), and to coordinate the RADAR detection with other nodes of the communications network (e.g. 2 of FIG. 1). The decision process controller 92 initiates a process/action in the radio communications node and/or initiates a process/action for any other radio communications nodes or any other RADAR signal detection devices in the radio communications network, if a RADAR pulse or burst is detected. The decision process controller 92 may communicate with any dedicated device(s) for the RADAR signal detection in the radio communications network. The RADAR signal observation or RADAR signal/pulse detection result may be provided by any other radio communications node(s) or dedicated devices for the RADAR signal detection.

For example, if the pulse correlates well with a previously seen pulse which has low self-correlation, or has been identified as a RADAR signal, it is likely a RADAR signal (i.e. a repeated RADAR signal has been detected). If all of the measurements meet a requirement of a RADAR signal, then it may be identified as a real RADAR pulse. For example, the RADAR pulse detector 90 may determine that the examined pulse is a real RADAR pulse only if it exceeds the regulatory pulse amplitude, has a pulse duration within the regulatory parameter range, has a self-correlation less than a threshold, and has a correlation with at least one of the pulses stored in the pulse storage memory 86.

The previously received bursts/repeated pattern may be used for the correlation. The pulse received from the RF front end and pulse detector 34 is correlated with all of the stored waveforms in the pulse storage memory 86 and if the pulse corresponds to one of the stored waveforms (i.e. has a high correlation), the RADAR pulse detector 90 is informed that the received pulse corresponds to the previously received bursts/repeated pattern.

A pulse that correlates with a previously detected RADAR pulse, as well as corresponding to the signal level and duration threshold is more likely to be a real RADAR signal than one which only matches the signal level and duration threshold criteria. The signal level and duration criteria may be frequently mimicked by noise, interference or collisions in the radio communications channel. Basing a decision on such limited information may lead to a high rate of false detection. As the regulations require the communications system to relinquish its use of the channel when it detects a RADAR signal, such false detections can lead to significant unavailability of channels and consequent poor, or blocked, performance of the communications system. Thus, the positive correlation of pulses with RADAR pulses previously sampled provides a further indication that a received pulse is a RADAR signal.

The RADAR waveform details are generally unknown to the radio communications system, and in many cases "unknowable" outside of some RADAR communities. Thus, sampling and storing local signals provides an additional means to accurately and quickly identify RADAR bursts. Even a single burst that correlates with a previously recognized RADAR burst can be detected rapidly and accurately. This rapid response will benefit a RADAR the operator by assuring the radio communications device will quickly clear the channel and hence cause a minimum of interference to the RADAR operations. Thus using the correlators and detecting either or both a low level of self-correlation or a correlation with a previously detected RADAR signal provides an effective mechanism for the radio communications system's RADAR detector to improve its accuracy of detection and response time while maintaining a low rate of false detections.

The initial ITU agreements for sharing the bands between RADAR systems and communications systems were predicated on there being some recognizable periodicity in the RADAR signals that could be used by the radio communications devices to distinguish RADAR pulses from noise or other signals. However, many modern RADAR systems do not use periodic signals, and so are harder to distinguish from noise or other signals. By correlating the received waveform to determine its self-correlation and its correlation with previously known RADAR signals, the radio communications system's RADAR detector may detect a RADAR signal more accurately and quickly than is possible by simply measuring the signal level and duration.

The information stored in the pulse storage memory 86 may be protected against its disclosure outside the radio communications system's RADAR detector apparatus. Some RADAR operators consider information about their waveforms to be proprietary and require that the sample information is stored in a secure way such that it can't be revealed outside the radio communications device. Encrypting the waveform samples when they are stored in the pulse storage memory 86, accessible only to correlator/key hardware is a preferred method to meet this need.

FIG. 9 illustrates one example of a storage unit 100 where information on the pulse storage memory 86 is securely stored. The secure storage unit 100 stores RADAR samples and prevents them from becoming known outside the radio communications device. The stored signatures are encrypted/decrypted using one or more keys. Each key may be based on the sequence of randomly selected received pulses. This sequence, and hence the, key is known only to the individual radio communications device as it depends on what was previously received by that individual receiver system at its location.

The secure storage unit 100 includes a random key selector 102, a key storage 104, a pulse selector 106, a pulse storage memory 108, encryption module 110 and decryption module 112. The pulse selector 106 and the pulse storage memory 108 are similar to the pulse selector 84 and the pulse storage memory 86 of FIG. 8, respectively.

One or more keys for the encryption 110 are selected randomly from one of the received waveform sequences by the random key selector 102. The key storage 104 stores the one or more keys selected by the random key selector 102. The key is thus only known to the secure storage unit 100. The key storage 104 may be Random Access Memory (RAM) that loses the stored content if power is interrupted, and cannot be read outside of the hardware associated with the correlators 50 and 88. Additionally the key may be updated with other pulse signatures at random intervals.

The RADAR waveform samples are encrypted (110) before entering the pulse storage memory 108. The stored waveforms are decrypted (112) before entering the pulse correlator 88 for comparison with received pulses.

The encryption by the encryption module 110 and the decryption by the decryption module 112 may, but not limited to, use a cipher block chain mode of the Data Encryption Standard (DES). The encryption module 110 and the decryption module 112 may use any algorithms other than the cipher block chain mode of the DES, which have the required degree of security, speed of operation, complexity of implementation and permit synchronisation with the various length sequences of the stored waveforms.

The pulse storage memory 108 may be re-keyed at random intervals, using additional pulses as key patterns to provide additional protection. With this apparatus, the stored waveform information is only known within the correlators 50 and 88, is inaccessible outside the radio communications device and is lost at power interruptions.

If the wrong key is used, a random sequence may be produced at the output of the decryption 112. It is a property of the encryption/decryption process that they produce a random stream of bits when the wrong key is used. In this case, the correlation with an input signal will also be equivalent to a random signal. Thus, a re-keying or other change in the secure storage unit 100 will not cause a false confirmation of a RADAR signal.

The signal patterns may be stored into the pulse storage memory 108 during manufacture or latterly from computer or communications apparatus connected to the radio communications device. Information from other sources, such as the pulse timing pattern, or confirmation from other cooperating radio communications devices may be used to trigger the storage of a pulse waveform. The externally obtained information 94 may be directly entered into the storage unit 100 to permit fast and accurate recognition of these signals even from a single pulse.

In the description above, one storage memory (86 of FIG. 8, 108 of FIG. 9) is shown. However, it may not be necessary to encrypt some RADAR waveforms (e.g. civilian RADAR pulses). Thus, more than one storage unit may be provided to examine received signals, where one stores public-known RADAR waveforms without encryption and the other stores the other RADAR waveforms with encryption.

The storage memory (86 of FIG. 8, 108 of FIG. 9) may contain multiple sections. Some sections may contain information about public waveforms that need not be encrypted and need not be erased in the event of power loss or tampering or protected against disclosure outside the apparatus. Some sections may require protection against outside disclosure and hence be encrypted. The radio communications receiver system having the RADAR signal detection may include both memory arrangements as shown in FIGS. 8 and 9.

Using the secure storage 100, the radio communications receiver system may determine that an unknown signal is a real RADAR signal only if it exceeds the regulatory pulse amplitude, has a pulse duration within the regulatory parameter range, does not contain the standard radio communications burst preamble signature and has an average autocorrelation at one or more time offsets from zero that is less than a threshold and corresponds to a previously detected RADAR signal.

Figure 10:
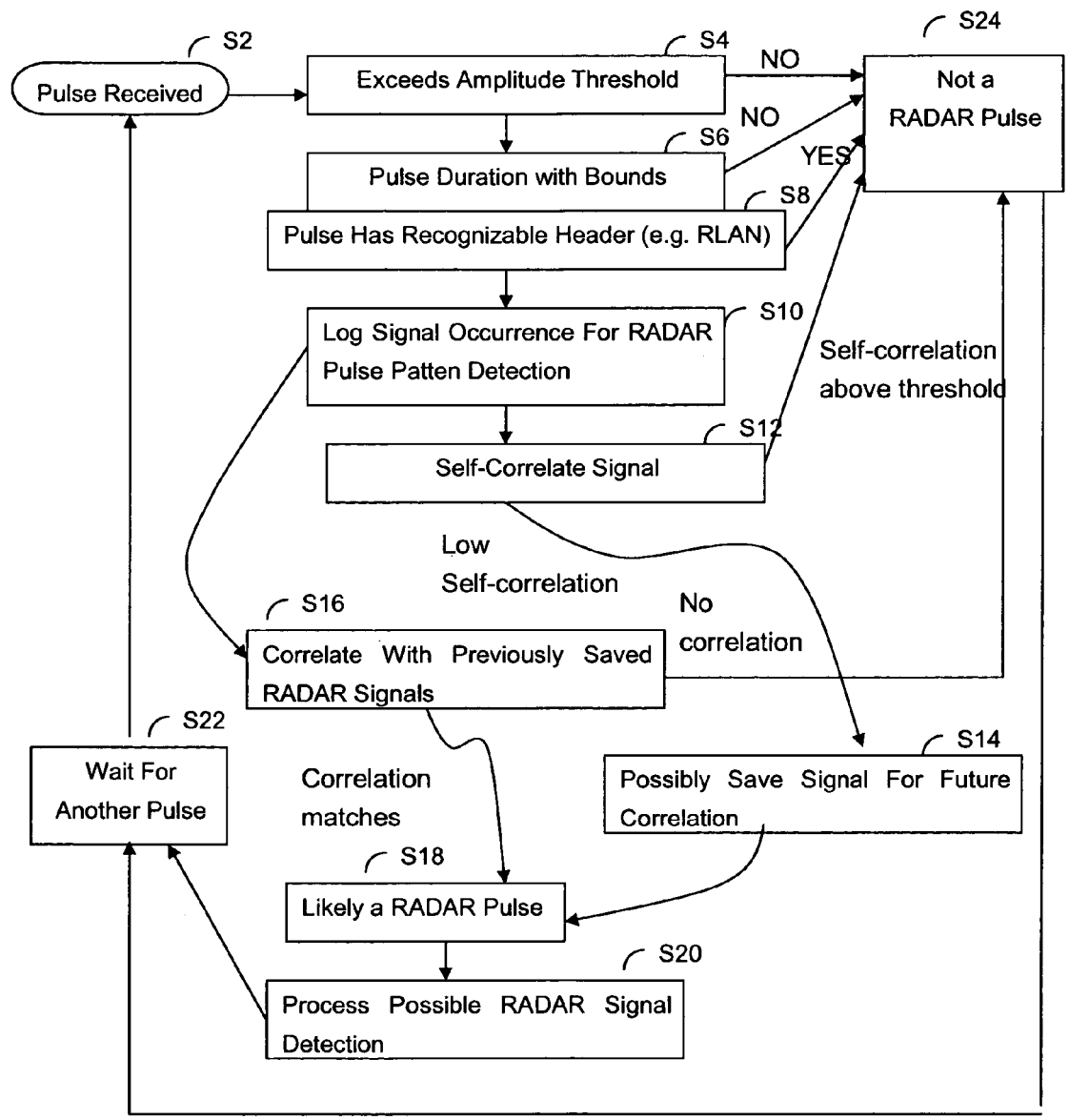
FIG. 10 illustrates an exemplary process of the RADAR signal detection implemented by the radio communications receiver system of FIG. 8.

FIG. 10 illustrates an exemplary process of the RADAR signal detection implemented by the radio communications receiver system 30D of FIG. 8. In FIG. 10, the self-correlation of a pulse and its correlation with previously stored waveforms are implemented. However, any one of the correlation processes may be selectively implemented.

Referring to FIG. 10, the radio communications receiver system monitors one or more channels for signals. At step S2, a pulse is received. At step S4, the pulse having amplitude above a predetermined threshold is detected. If the amplitude is below the threshold, it is identified as non-RADAR pulse at step S24, and may not be processed. At step S6, the pulse having duration within the pulse duration bounds is detected. If the duration is outside the pulse duration bounds, it is identified as non-RADAR pulse at step S24, and may not be processed. At step S8, a pulse having a certain header/preamble/signature is detected. If the pulse has a recognizable header, such as the radio communications preambles/headers (e.g. headers defined by 802.11 or 802.16), it is identified as non-RADAR pulse at step S24, and may not be processed.

It is noted that steps S4, S6, S8 may be implemented in different orders. Steps S4, S6, S8 may be implemented in parallel. The pulse amplitudes may be adjusted to compensate for antenna gains at which the pulses are detected.

At step S10, the occurrence of the pulses with a signal level and duration threshold corresponding to the RADAR criteria is logged with their time of occurrence and duration. This log enables RADAR signals to be detected by searching the log for periodicities that correspond to the patterns in the ITU agreements. The log operation may be implemented by the RADAR pulse detectors or decision process controllers in FIGS. 2 and 6-8.

At step S12, the self-correlation is implemented. It is determined whether the pulse has a self-correlation above a threshold. At step S14, the pulse with correlation below the threshold may be stored for future reference. At step S16, the correlation with previously stored RADAR waveforms is implemented. It is determined whether the pulse correlates with a previously stored RADAR signal.

In FIG. 10, both of the self-correlation of the pulse and its correlation with previously stored waveforms are implemented. These two operations may be implemented in parallel (step S12 and step S16). The outputs of the two correlation processes S12 and S 16 are provided to S24. If there is no match in these two correlation processes S12 and S16, it is identified at step S24 that the pulse is a non-RADAR pulse, and the pulse may not be processed.

However, if the pulse has a low self-correlation, or there is a high correlation with previously stored RADAR signals, at step S18, it is identified to be "likely a RADAR pulse" and the next action is triggered at step S20.

The decision of "likely a RADAR pulse" is used to trigger the radio communications node to respond to the RADAR signal detection. At step S20, whereupon the RADAR detection system, the receipt of another pulse is awaited. It is noted that the radio communications node may not wait for the processing to be completed as another pulse may be received during the processing and needs to be processed during that interval. The RADAR pulse detection for the next pulses may be implemented while waiting for a further pulse. The output of the box "Not a RADAR pulse" (S24) also connects to step S22.

In FIG. 10, the pulse amplitude and pulse duration are detected. However, the pulse repetition interval, number of pulses and frame interval (FIG. 4) as well as the pulse amplitude and pulse duration may be detected across a plurality of received pulses for pattern matching. The pattern matching may involve comparing, for example, any one or more of a signal strength, a pulse width, a pulse repetition rate, and a frame interval of the detected pulses against those of RADAR signals. In some implementations, a plot of an inter-arrival time of all pulses of the detected signal received over a predetermined period of time of a few minutes, for example, may be used to determine if the pulses are part of a RADAR pattern or simply noise interference.

The inter-arrival time refers to the time between the arrival of pulses. Studying the inter-arrival time may be used as one way to detect the pulse repetition interval even when all the pulses have not been detected. One method, when a new pulse above the detection threshold is detected, is to calculate the time difference between the new pulse arrival time and all the recent pulse arrival times in the log (i.e. the past minute's list of received pulses). A histogram, or frequency count, may then be created by binning all the differences. For example the first bin of the histogram may count all the occurrences of time difference between 0 and 5 microseconds, bin 2 those between 5 and 10, three those between 10 and 15, etc. If the pulses are random in occurrence, the bins after receipt of many pulses will be about equally filled. However, if some or all of the pulses are arriving at some fixed rate, then some bins will show higher counts. These will indicate the pulse period and multiples there of, even if some of the pulses in the bursts were not received.

It is noted that the steps of S2-S22 may be implemented using more than one radio communication node (or more than one dedicated RADAR signal detection device) in the communications network. For example, the pulse amplitude and duration measurement circuit (40) may be at one location, the correlation system (82) at another location and the RADAR pulse detector (90) at another location. These locations would all be within the coverage area of the RADAR signals. The measurements from these units would be communicated through the network among the communications nodes and used by the RADAR pulse detector (e.g. 64, 74, 90) to determine if a RADAR pulse is detected. A single RADAR pulse detector may be provided to support multiple radio communications nodes in the network, or each node may contain its own RADAR pulse detector. The distributed arrangement has the advantage that the correlation system and its associated memory need only be provisioned once in the network at some savings in cost. With the distributed arrangement of devices their measurements are coordinated in time. This may be accomplished by maintaining synchronised clocks at each node and providing a time-stamp of the signal occurrence with each measurement exchanged among the nodes. The clocks in each node may be synchronised by many known means. The use of Global Positioning System (GPS) receivers at each note is one effective means to establish synchronisation. As the communication nodes typically include a suitable synchronisation means for purposes of coordinating their inter-node communications, this may be reused for the RADAR detection process.

For example, the radio communications node may query one or more neighboring nodes for information on the neighboring nodes' detection results. Based on the integrated detection results, the monitoring of channels may resume; otherwise, the radio communications node may negotiate with the neighboring nodes to select another channel.

Referring to FIGS. 1, the radio communications receiver system having the function of the RADAR signal detection (e.g. 30A-30D of FIGS. 2 and 6-8, 100 of FIG. 9) may be employed in the radio communications nodes at the perimeter edge of the radio communications network 2 (hereinafter referred to as edge node). In this employment, the interior radio communications nodes (hereinafter referred to as interior nodes) are not burdened by monitoring, detection, and filtering processes. Thus, their resources can be devoted to the traffic of the radio communications network. In this hybrid approach, the edge nodes handle smaller amounts of traffic than the interior nodes. Thus, the performance of the edge nodes is not compromised by the additional RADAR scanning and monitoring. The edge nodes may be designated individually to provide RADAR detection functionality.

The radio communications nodes may automatically determine whether they are edge or interior nodes based on their interconnectivity within the radio communications network 2. The edge nodes, for example, may have only a single network interconnection link to the interior nodes in the radio communications network 2, whereas the interior nodes may have multiple links. Furthermore, in some implementations once a radio communications node determines that it is an edge node, it may automatically activate the functions of the RADAR signal detection. Similarly, if the radio communications node determines that it is an interior node, it may automatically assume a role of not monitoring for RADAR signals and relying on the edge nodes for the RADAR signal detection.

It is noted that in the description above, operations are described as a series (i.e. as if they occur one after the other). However, they may be equally, and for purposes of increased speed of detection, be done in parallel, for example with the amplitude, duration, interval, and correlation measurements as described above all being performed simultaneously.

According to ITU recommendation M1652, a radio communications system must vacate the channel quickly and remain off the channel for at least half an hour if it detects a RADAR signal. Thus, a radio communications system is demanded to minimize false detections to limit the disruption to its operations that happen while the radio communications system selects a new channel and the consequent reduction in system traffic capacity through unnecessary loss of channels.

According to the embodiments of the present invention, the RADAR detection distinguishes RADAR signals from noise or other radio, and the incidence of false detections is reduced due to the presence of noise. Hence it enables the radio communications system to continue operations without interruptions due to the false detection of RADAR signals. The RADAR signal detection ensures rapid and accurate RADAR signal detection for a wider variety of RADAR waveforms. Systems using the RADAR signal detection described above have fewer interruptions due to false detection of RADARs and hence can improve capacity, speed and reliability of transmission. The RADAR signal detection may also minimize a radio communications device's interference to the RADAR systems.

According to the embodiments of the present invention, RADAR signals can be detected more quickly, in some cases even from a single burst, more reliably (i.e. with fewer false detection) for a wider scope of RADAR signals than the basic ITU method. This may be used to provide a product that can make better use of the shared bands to provide higher capacity (through higher availability of channels), higher reliability (through fewer interruptions due to channel reselection) and better protection for the RADAR systems than that of the conventional methods. A class of aperiodic RADAR signals which are not detectable using the procedures outlined in the ITU agreements are detectable.

According to the embodiment of the present invention, the correlator measurement may allow the radio communications receiver system to confirm the presence of the RADAR signal quickly and reliably and hence meet the RADAR detection response time and the radio communications false detection reliability. The correlator may be added to the standard radio communications radio receiver apparatus so that the additional detector apparatus is economical to incorporate in the radio Deleted: s communications receiver apparatus.

According to the embodiment of the present invention, the RADAR signal detection provides for more rapid detection thereby providing additional protection for RADAR operators by allowing the radio communications device to vacate the channel more promptly.

All citations are hereby incorporated by reference.

The present invention has been described with regard to one or more embodiments. However, it will be apparent to persons skilled in the art that a number of variations and modifications can be made without departing from the scope of the invention as defined in the claims.

What is claimed is:

1. A system for detecting a RADAR signal in a communications network which utilizes signals different from the RADAR signal, the system comprising:
   a receiver for receiving a first pulse;
   a self-correlator for measuring a self-correlation of the first pulse with a non-zero time offset copy of the first pulse;
   a comparator for comparing the self-correlation measurement with a threshold that is set from expected correlation of receiver noise; and
   a detector for determining that the first pulse is a RADAR pulse when the self-correlation measurement is lower than the threshold that is set from expected correlation of receiver noise.

2. A system according to claim 1, further comprising:
   a correlator for measuring the correlation of the first pulse with predefined pulses,
   the RADAR pulse being detected based on the self-correlation measurement and the correlation measurement.

3. A system according to claim 1, wherein the self-correlator correlates samples of the first pulse with themselves at a pluriaty of non-zero time offsets, the average of the self-correlation measurements at the plurality of non-zero time offsets being compared with the threshold by the comparator.

4. A system according to claim 1, further comprising:
   a memory circuit for logging a newly received pulse for later use in searching for periodicities corresponding to a RADAR signal.

5. A system according to claim 1, wherein a plurality of communications nodes form the communications network, with at least two of the communications nodes having the self-correlator, the detector or a combination thereof.

6. A system according to claim 2, further comprising:
   a memory system for storing one or more pulse sequences including an externally detected pulse sequence, the pulse sequence being used as the predefined pulses.

7. A system according to claim 3, wherein a self-correlation at a zero time offset is measured by the self-correlator, a ratio of the non-zero time offset average to the self-correlation measurement at the zero time offset being compared with the threshold by the comparator.

8. A system according to claim 5, wherein the system further comprises:
   a processor for determining an action of the communications nodes in response to the detection of the RADAR pulse.

9. A system according to claim 6, further comprising:
   a circuit for examining one or more characteristics of the first pulse,
   wherein the detector detects the RADAR pulse based on the output from the comparator, or the output from the comparator and the one or more characteristics.

10. A system according to claim 7, wherein the memory system includes:
    a selector for selectively storing the pulse sequence into the memory system.

11. A system according to claim 6, wherein the memory system includes:
    an encryption module for encrypting the pulse sequence before storing, and
    a decryption module for decrypting data stored in the memory system for the correlation.

12. A system according to claim 6, wherein the first pulse is stored in the memory system when its self-correlation measurement is low.

13. A system according to claim 8, wherein the detection of the RADAR pulse is exchanged between the communications nodes for channel sharing.

14. A system according to claim 9 wherein the detector coordinates the actions of the self-correlator, the circuit and the memory system.

15. A system according to claim 9, further comprising:
    a correlator for measuring the correlation of the first pulse with externally obtained pre-defined pulses.

16. A system according to claim 9, wherein the circuit includes:
    a measurement module for measuring the one or more characteristics of the first pulse, and/or
    a header detector for detecting a header or a standardized signature signal that identifies the format of a communications transmission.

17. A system according to claim 9, wherein the circuit includes:
    a circuit for implementing pattern matching to the first pulse.

18. A system according to claim 11, wherein the memory system comprises:
    a first memory section for storing encrypted data, and
    a second memory section for storing data other than the encrypted data.

19. A system according to claim , wherein the memory system uses a key selector for randomly selecting one or more keys from the pulse received at the receiver.

20. A system according to claim 15, wherein the self-correlator, the correlator or a combination thereof is enabled based on the examination result.

21. A system according to claim 9, further comprising:
    a memory system having a memory for storing information for the pattern matching.

22. A system according to claim 19, wherein the memory system includes a key storage for storing the one or more keys.

23. A method of detecting a RADAR signal in a communications network which utilizes signals different from the RADAR signal, the method comprising the steps of:
    receiving a first pulse by a receiver;
    measuring a self correlation of the first pulse with a non-zero time offset copy of the first pulse;
    comparing the self-correlation measurement with a threshold that is set from expected correlation of receiver noise;
    when the self-correlation measurement is lower than the threshold that is set from expected correlation of receiver noise, determining that the first pulse is a RADAR pulse.

24. A method according to claim 23, further comprising the step of:
    examining one or more characteristics of the first pulse,
    the self-correlation measurement being implemented based on the examination result.

25. A method according to claim 23, further comprising the step of:
    logging a newly received pulse for later use in searching for periodicities corresponding to a RADAR signal.

26. A method according to claim 23, further comprising:
    correlating the first pulse with pre-defined RADAR pulses in a memory.

27. A method according to claim 23, wherein a plurality of communications nodes form the communications network, and further comprising the step of:
- at a communications node, initiating a new action of the communications node in response to the detection of the RADAR pulse.

28. A method according to claim 23, wherein a plurality of communications nodes form the communications network, and further comprising the step of:
- among the communications nodes, exchanging the self-correlation measurement, the detection of the RADAR pulse, or a combination thereof.

29. A method according to claim 24, further comprising:
- measuring a self-correlation of the first pulse at a plurality of non-zero time offsets and calculating the average of the self-correlation measurements at the plurality of non-zero time offsets;
- measuring a self-correlation of the first pulse at a zero time offset and calculating a ratio of the non-zero time offset average to the self-correlation measurement at the zero time offset,
- the determining step implementing the determination based on the comparison between the average or the ratio and the threshold.

30. A method according to claim 26, further comprising:
examining one or more characteristics of the first pulse.

31. A method according to claim 29, further comprising the step of:
- storing the first pulse in a memory when the self-correlation measurement is low.

32. A method according to claim 30, wherein the step of correlating the first pulse with pre-defined RADAR pulses is implemented based on the examination result.

* * * * *